(12) United States Patent
May

(10) Patent No.: US 8,074,789 B2
(45) Date of Patent: Dec. 13, 2011

(54) CONVEYOR BELT MONITORING

(75) Inventor: Anthony Michael May, Chorley (GB)

(73) Assignee: Fenner Dunlop Limited, Hessle, East Yorkshire (GB)

( * ) Notice: Subject to any disclaimer, the term of this patent is extended or adjusted under 35 U.S.C. 154(b) by 415 days.

(21) Appl. No.: 12/065,516

(22) PCT Filed: Aug. 29, 2006

(86) PCT No.: PCT/GB2006/003190
§ 371 (c)(1),
(2), (4) Date: Jul. 15, 2008

(87) PCT Pub. No.: WO2007/026135
PCT Pub. Date: Mar. 8, 2007

(65) Prior Publication Data
US 2008/0308391 A1 Dec. 18, 2008

(30) Foreign Application Priority Data
Sep. 1, 2005 (GB) .................................. 0517759.7

(51) Int. Cl.
*B65G 43/00* (2006.01)
(52) U.S. Cl. .................................. 198/810.02; 198/502.1
(58) Field of Classification Search ............... 198/502.1, 198/810.01, 810.02, 810.03
See application file for complete search history.

(56) References Cited

U.S. PATENT DOCUMENTS

| | | | | |
|---|---|---|---|---|
| 3,750,129 A | * | 7/1973 | Takeno et al. | 198/810.02 |
| 3,834,524 A | * | 9/1974 | Ratz et al. | 198/810.02 |
| 3,899,071 A | * | 8/1975 | Duffy | 198/810.02 |
| 4,541,063 A | * | 9/1985 | Doljack | 198/810.02 |
| 4,864,233 A | * | 9/1989 | Harrison | 324/227 |
| 5,426,362 A | * | 6/1995 | Ninnis | 324/235 |
| 5,570,017 A | * | 10/1996 | Blum | 324/232 |
| 5,847,563 A | * | 12/1998 | Blum | 324/232 |
| 6,015,038 A | * | 1/2000 | Stoxen et al. | 198/322 |
| 6,291,991 B1 | * | 9/2001 | Schnell | 324/235 |
| 6,523,400 B1 | * | 2/2003 | Ahmed | 73/114.77 |
| 6,532,810 B1 | * | 3/2003 | Ahmed | 73/114.77 |
| 6,633,159 B1 | * | 10/2003 | Robar et al. | 324/240 |
| 6,712,199 B1 | | 3/2004 | Brueckner et al. | |
| 7,275,637 B2 | * | 10/2007 | Brown | 198/810.02 |
| 2001/0045835 A1 | * | 11/2001 | Ahmed | 324/526 |

(Continued)

FOREIGN PATENT DOCUMENTS
EP 0 213 057 3/1987
(Continued)

*Primary Examiner* — Gene Crawford
*Assistant Examiner* — William R Harp
(74) *Attorney, Agent, or Firm* — Young & Thompson

(57) ABSTRACT

A system of monitoring operation for a conveyor belt installation includes a conveyor belt having steel or other relatively magnetically permeable reinforcing material, the system including, in proximity to the conveyor belt, a magnetic field generator, and a sensor unit at a position downstream from the field generator, the sensor unit sensing the magnetic field emanating from the passing conveyor belt, and a monitoring unit to receive data related to the magnetic field properties sensed by the sensor unit during a plurality of passages of each part of the length of the conveyor belt past the sensor unit, the monitoring unit incorporating comparison elements to compare a received set of data with an earlier received set of data, and output elements to provide an output signal representative of reinforcement damage or deterioration when subsequently received data has departed from earlier received data by more than a prescribed extent.

16 Claims, 1 Drawing Sheet

U.S. PATENT DOCUMENTS

2010/0025198 A1 * 2/2010 Wallace et al. .......... 198/810.02

FOREIGN PATENT DOCUMENTS

| EP | 0 590 734 | 4/1994 |
| GB | 1 368 363 | 9/1974 |
| GB | 2 303 834 A | 3/1997 |
| JP | 57-180517 | 11/1982 |
| RU | 2 016 404 | 7/1994 |
| SU | 1558814 | 4/1990 |
| WO | WO 2005/005292 | 1/2005 |

* cited by examiner

CONVEYOR BELT MONITORING

CROSS-REFERENCE TO RELATED APPLICATIONS

The instant application claims priority and incorporates by reference PCT/GB2006/003190 filed Aug. 29, 2006 and Great Britain Application No. 0517759.7 filed Sep. 1, 2005.

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC

None.

BACKGROUND OF THE INVENTION

1. Field of the Invention

This invention relates to a system, method and apparatus for monitoring operation of a conveyor belt.

2. Description of Related Art

It relates in particular, though not exclusively, to monitoring the operation of a conveyor belt installation wherein the belt is a steel cord reinforced belt. It may, however, be employed with belts reinforced by other relatively magnetically permeable materials, the expression "relatively magnetically permeable" being used herein to refer to a reinforcement permeability which is greater than that of the belt material which is reinforced by said reinforcement.

One problem commonly experienced in the use of conveyor belts employed to transport heavy or sharp items, such as quarried or mined material, is that the belt is exposed to the risk of puncture. If the item causing puncture becomes wedged relative to the conveyor support structure instead of moving with the belt, there is a particular risk that the belt will then be longitudinally slit as it passes the wedged object, and much expensive damage will result.

Another problem encountered is that over a period of time the reinforcement members are at risk of deterioration. Although typically the steel cords or other reinforcing members are embedded in the elastomeric material of a belt, if, for example, that embedding material becomes degraded or locally damaged there is a risk of water or other damaging material or fluid coming into contact with and degrading the reinforcement. In consequence the belt will cease to function properly and in due course may break.

To avoid or minimise the risk of breakage or other potentially dangerous situations arising it is known to over-design the reinforcement so that even following a predicted degree of reinforcement degradation, the reinforcement remains safe for use and break resistant over a period of time which at least equals the likely period for which the belt cover material is expected to remain in a serviceable condition. That over-design is, however, undesirable because it increases the weight and cost as well as reducing flexibility of the belt, and also fails accurately to safeguard against a possible premature part or total failure of the reinforcement.

BRIEF SUMMARY OF THE INVENTION

The present invention seeks to provide a method, system and apparatus by which the aforediscussed problems may be mitigated or overcome.

In accordance with one aspect the present invention there is provided a system for monitoring operation of a conveyor belt installation which comprises a conveyor belt having steel or other relatively magnetically permeable reinforcing material, said system comprising a field generator arranged in proximity to the conveyor belt to generate a magnetic field, a sensor unit arranged in proximity to the conveyor belt at a position downstream from the field generator as considered in a normal direction of belt movement, said sensor unit sensing the magnetic field emanating from the passing conveyor belt, and monitoring means to receive data related to the magnetic field properties sensed by the sensor unit during a plurality of passages of each part of the length of the conveyor belt past the sensor unit, said monitoring means incorporating comparison means to compare a subsequently received set of data with an earlier received set of data, and output means to provide an output signal representative of reinforcement damage or deterioration when subsequently received data has departed from earlier received data by more than a prescribed extent.

It is further taught by the present invention that the system may comprise compensation means whereby the response characteristics of a sensor unit, or data received or processed by the monitoring means, may be selectively modified to compensate for differences between the response characteristics of different sensors which may be employed over a period of time, or change in performance in any one sensor unit over a period of time. Thus the overall response characteristics of the system and associated output signal representative of the belt reinforcement condition may be rendered substantially unaffected by a change in sensor unit characteristics.

The compensation means typically may be in the form of a programmable micro chip. The compensation means may be embodied within a sensor unit or, for example, may be provided integrally with the monitoring means.

The system may comprise position sensing means, such as an encoder, which provides information to the monitoring unit related to the speed and/or position of the conveyor belt. Thus the monitoring unit is then able to compare the instantaneous signal received from a sensor unit with the signal received from that sensor unit during a previous passage of the same portion of the conveyor belt past the sensor unit.

It is envisaged that the system will operate continuously in a real time mode. However the invention does not exclude the option for intermittent operation, for example, on a real time hourly or daily basis, on an interval related to belt operating time, or on the basis of number of belt passes.

The comparison means may operate to compare received data with that received during an immediately preceding pass of the conveyor belt. However, whilst that may be satisfactory for a system designed primarily to detect rip damage, for example damage to transversely extending reinforcement elements of a rip detection panel, that is not envisaged as being so appropriate for monitoring of the longer term degradation due to corrosion effects on longitudinally extending reinforcement elements.

Thus for monitoring longer term degradation it is taught that the monitoring unit may comprise a data store which stores data related to the conveyor belt properties as detected either at the time of initial installation or, for example, following a maintenance or repair operation. A selective override facility may be provided such that in the event of a localised belt repair the data store is able to store updated information in respect of properties of the repaired length of conveyor belt but retain the originally or earlier stored data in respect of the remainder of the length of the conveyor belt.

In the case of a conveyor belt installation which is designed to be reversible, a sensor unit may be provided at either side of the field generator, longitudinally spaced therefrom. The monitoring unit in that case may be operable to compare the signals received from the two sensor units when the belt is operated successively in forward and reverse directions and thereby distinguish between any changes which are due to deterioration of the conveyor belt reinforcement and any changes due to drift or other type of change in response characteristics of the two sensor units.

The output signal provided by the output means preferably provides an indication of the extent to which the conveyor belt properties may have departed beyond acceptable limits. Thus the output means may show a low warning level in the event of degradation which does not immediately endanger the operation of the conveyor belt installation but which will require maintenance or repair action, and at least a second level of warning in the event of a major or rapid rate of change of conveyor belt reinforcement characteristics, in response to which automatic or manual shut down of the installation may be appropriate.

The or each sensor unit provided at a fixed position relative to the conveyor belt support structure may comprise a plurality of sensor elements each primarily responsive to properties of a respective section of the transverse width of the belt. The sensor elements may each be of a kind which provide analogue signals that are then converted to digital signals for processing by the monitoring unit.

The present invention also provides a method of monitoring a conveyor belt wherein it performs the functions of the aforedescribed system, and apparatus which similarly is operable to perform the aforedescribed monitoring functions.

BRIEF DESCRIPTION OF THE SEVERAL VIEWS OF THE DRAWINGS

One embodiment of the present invention will now be described, by way of example only, with reference to the accompanying diagrammatic drawings in which.

DETAILED DESCRIPTION OF THE INVENTION

Figure 1:
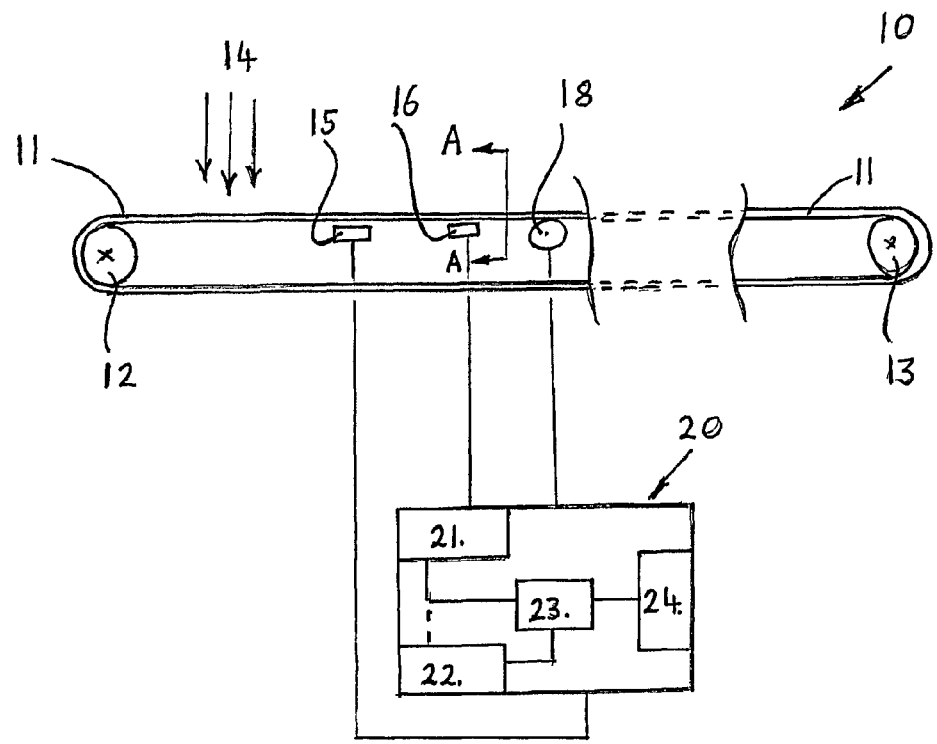
FIG. 1 is a side view of a conveyor belt installation in accordance with the present invention.

A conveyor belt installation 10 comprises a steel cord reinforced conveyor belt 11 which is driven, by drive means known per se, between end rollers 12, 13.

At a position a short distance downstream from the conveyor belt load zone 14 a magnetic field generator 15 is positioned underneath the top run of the conveyor belt, and extends across the whole width of the conveyor belt. The belt comprises an array of substantially identical, uniformly spaced and longitudinally extending steel reinforcing cords 19. Thus each of the reinforcing cords is subjected to substantially the same strength of magnetic field.

Downstream of the magnetic field generator, typically spaced by a distance of 1 to 10 metres, a sensor unit 16 is provided. That is positioned underneath the top run of the belt and extends across the whole of the width of the belt.

Figure 2:
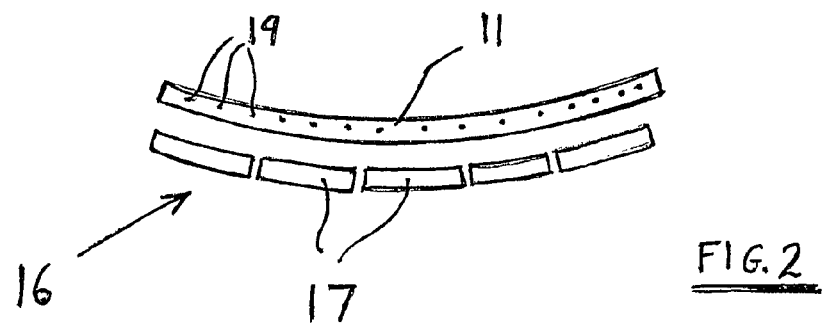
FIG. 2 is a transverse section of part of the installation of FIG. 1 on the line A-A of FIG. 1.

The sensor unit 16 comprises five sensor elements 17 arranged in series with one another as viewed in the transverse sectional view of FIG. 2.

Downstream from the sensor unit 16 the belt is supported by one of a plurality of non-driven support pulleys 18. That pulley embodies a pulse encoder to provide an output related to the movement and/or speed of the belt.

The conveyor belt installation 10 additionally comprises a monitor unit 20 which incorporates a compensation unit 21, a data store 22, a comparison unit 23 and an output display unit 24.

In operation of the monitor unit 20, during an initial operational run of the conveyor belt the magnetic field generator 15 is powered and signals received from each of the sensor elements 17 are fed to the data store 22. During subsequent operation signals from the sensor elements 17 are fed to the comparison unit 23 where they are compared with the stored data in the data store 22.

The comparison unit incorporates an error magnitude sensor via which a warning signal is sent to the output display unit 24, with the type of warning signal being dependent on the magnitude or rate of change of differences monitored by the comparison unit.

In this embodiment the output means comprises a visual display with an audio facility to provide an audible warning in the event that the error of magnitude sensor receives from the comparison unit a signal related to an error of magnitude or rate of change of difference which is potentially concomitant with imminent or actual failure of a reinforcing cord.

The compensation unit 21 is positioned interposed between the sensor unit 16 and the comparison unit 23. It contains a programmable micro chip the characteristics of which can be varied such that compensation can be provided in respect of variation of individual performance characteristics of a sensor element 17. Thus if a sensor element 17 becomes damaged and requires to be replaced, the compensation unit can be employed to undertake a recalibration operation in which the new sensor element results in the comparison unit receiving, for a known magnetic field input of the sensor element 16, a signal corresponding closely to that would have been provided by the previously installed sensor element 17.

Accordingly the present invention assists in obviating the need for replacement sensor elements to be manufactured to a high level specification; lower cost sensor elements may be utilised and the variation in characteristics between successive sensor elements may be compensated readily by use of the compensation unit 21.

The invention claimed is:

1. A system for monitoring operation of a conveyor belt installation which comprises a conveyor belt having steel or other relatively magnetically permeable reinforcing material, said system comprising:

a field generator arranged in proximity to the conveyor belt to generate a magnetic field;

a sensor unit arranged in proximity to the conveyor belt at a position downstream from the field generator as considered in a normal direction of belt movement, said sensor unit sensing the magnetic field emanating from the passing conveyor belt; and monitoring unit to receive data related to the magnetic field properties sensed by the sensor unit during a plurality of passages of each part of the length of the conveyor belt past the sensor unit, said monitoring unit incorporating a comparison unit to compare a subsequently received set of data with an earlier received set of data, and an output unit to provide an output signal representative of reinforcement damage or deterioration when subsequently received data has departed from earlier received data by more than a prescribed extent, wherein the monitoring unit comprises a data store to store data related to conveyor belt properties as detected either at the time of initial installation or following a maintenance or repair operation of a conveyor belt, and a selective override facility is provided and operable, following one of a localized belt repair and maintenance operation, to update stored information solely in respect of properties of the part of the length of conveyor belt that has been the subject of one of the localized belt repair and maintenance operation but retain the originally or earlier stored data in respect of the remainder of the length of the conveyor belt.

2. The system according to claim 1, further comprising:
a compensation unit operable to allow the response characteristics of a sensor unit, or data received or processed by the monitoring unit, to be selectively modified to compensate for differences between the response characteristics of different sensor units employed over a period of time, or change in performance of any one sensor unit over a period of time.

3. The system according to claim 1, further comprising:
a position sensor to provide information to the monitoring unit related to at least one of a speed and a position of the conveyor belt.

4. The system according to claim 3, wherein the monitoring unit is operable to compare the instantaneous signal received from a sensor unit with the signal received from that sensor unit during a previous passage of the same portion of the conveyor belt past the sensor unit.

5. The system according to claim 1, wherein the comparison unit is operable to compare received data with that received during an immediately preceding pass of the conveyor belt.

6. The system according to claim 1, wherein, as considered in the direction of the length of a conveyor belt run, a sensor unit is provided at each side of the field generator, longitudinally spaced therefrom.

7. The system according to claim 6, wherein the monitoring unit is operable to compare signals received from said sensor units at each side of the field generator when a conveyor belt is operated successively in forward and reverse directions thereby to distinguish between changes due to deterioration of the conveyor belt reinforcement and changes due to drift or other type of change in response to characteristics of the two sensor units.

8. The system according to claim 1, wherein the output unit provides an output signal, which indicates the extent to which conveyor belt properties have departed beyond acceptable limits.

9. The system according to claim 8, wherein said output unit indicates a low warning level in the event of degradation which does not immediately endanger operation of a conveyor belt installation and a second level of warning in the event of a major or rapid change of conveyor belt reinforcement characteristics.

10. The system according to claim 1, wherein a said sensor unit comprises a plurality of sensor elements each primarily responsive to properties of a respective section of the transverse width of a conveyor belt.

11. The system according to claim 10, wherein said sensor elements are each of a kind which provide an analogue signal.

12. The system according to claim 11, wherein said analogue signals is converted to digital signals for processing by the monitoring unit.

13. The system according to claim 1, and comprising control means to initiate shut down of the installation in the event of the monitoring system indicating a major or rapid change of conveyor belt reinforcement characteristics.

14. A method of monitoring operation a conveyor belt comprising:
sensing via a sensor unit arranged in proximity to the conveyor belt at a position downstream from a field generator as considered in a normal direction of belt movement, the magnetic field emanating from the passing conveyor belt;
receiving data via a monitoring unit, said data related to the magnetic field properties sensed by the sensor unit during a plurality of passages of each part of the length of the conveyor belt past the sensor unit;
comparing via a comparison unit a subsequently received set of data with an earlier received set of data;
outputting via an output unit an output signal representative of reinforcement damage or deterioration when subsequently received data has departed from earlier received data by more than a prescribed extent; and
storing via a selective override facility information updates solely in respect of properties of the part of the length of conveyor belt that has been subject to one of a belt repair and a maintenance operation but retaining the originally or earlier stored data in respect of the remainder of the length of the conveyor belt upon a localized one of the belt repair and the maintenance operation,
wherein the monitoring unit comprises a data store to store data related to conveyor belt properties as detected either at the time of initial installation or following a maintenance or repair operation of a conveyor belt,
the field generator arranged in proximity to the conveyor belt to generate a magnetic field, and
the conveyor belt having steel or other relatively magnetically permeable reinforcing material.

15. The method according to claim 14, wherein the system is operated in real time mode.

16. The method according to claim 14, wherein the system is operated intermittently on one of real time intervals, belt operating time intervals or number of belt passes.

* * * * *